(12) United States Patent
Yen et al.

(10) Patent No.: US 6,580,614 B2
(45) Date of Patent: Jun. 17, 2003

(54) OPTICAL TRANSCEIVER MODULE WITH METALLIC LATCHES

(75) Inventors: Chia-Sung Yen, Tu-Chen (TW); Nan Tsung Huang, Tu-Chen (TW); Shaoming Fu, Pan-Chiao (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/021,381

(22) Filed: Oct. 30, 2001

(65) Prior Publication Data

US 2003/0072137 A1 Apr. 17, 2003

(30) Foreign Application Priority Data

Oct. 12, 2001 (TW) ...................................... 90217381 U

(51) Int. Cl.⁷ ................................................. H05K 7/00
(52) U.S. Cl. ....................... 361/728; 361/752; 361/759; 361/801; 439/153; 385/88
(58) Field of Search ................................ 361/728, 736, 361/752, 759, 801; 439/76.1, 131, 153; 385/88, 89; 257/432, 433

(56) References Cited

U.S. PATENT DOCUMENTS 5,734,558 A * 3/1998 Poplawski et al. .......... 361/752
6,347,954 B1 * 2/2002 Jones et al. ................. 439/138

* cited by examiner

Primary Examiner—Jayprakash N. Gandhi
(74) Attorney, Agent, or Firm—Wei Te Chung

(57) ABSTRACT

An optical transceiver module comprises a base (1), a pair of metallic releasable latches (4) attached to opposite lateral sides of the base, and a housing. The housing includes an upper housing (71) and a lower housing (72), which are mounted to an upper side and a lower side of the base respectively. Each latch includes a retention portion (41), and a spring portion (42) bent generally perpendicularly from an outer end of the retention portion. The retention portions of the latches are inserted into receiving grooves (17) defined in side walls (14, 15) of the base. The spring portions of the latches sit on the side steps (152) of the base. The upper housing electrically engages with rear parts of the spring portions. Any electrostatic charge that develops on the upper and lower housings is dissipated to external ground via the latches.

7 Claims, 6 Drawing Sheets

OPTICAL TRANSCEIVER MODULE WITH METALLIC LATCHES

BACKGROUND OF THE INVENTION

1. Field of the Invention

The present invention relates to optical transceiver modules, and particularly to an optical transceiver module with releasable metallic latches for releasably attaching the module to a receptacle.

2. Description of Related Art

Optical transceiver modules are widely used for bi-directional transmission of data between an electrical interface and an optical data link. An optical transceiver module receives electrically encoded data signals and converts the electrical signals into optical signals. The optical signals are then transmitted over the optical data link. The module receives optically encoded data signals and converts the optical signals into electrical signals. The electrical signals are then transmitted onto the electrical interface. The module may be secured to a back-plane of a data exchange system or a large server.

FIG. 1 shows a removable optical transceiver module as disclosed in U.S. Pat. No. 5,734,558. The module has two releasable latches 350 integrally molded with opposite sides of a housing 312. The latches 350 have detents 360 received in apertures 384 of a shell 372 of a complementary receptacle 374. The module may be released from the receptacle 374 by pressing the latches 350 and simultaneously pulling the module out of the receptacle 374. However, after repeated insertion of the module into the receptacle 374 and release therefrom, the latches 350 are prone to break at points where they interconnect with the housing 312.

The latches 350 of the above-described module are integrally molded with the housing 312, and are made of insulative material. Therefore the latches 350 cannot function as a part of grounding paths of the module. Grounding paths of the module dissipate electrostatic charge that develops on the module, and protect the module from electromagnetic interference.

Therefore, an optical transceiver module that overcomes the disadvantages of conventional modules is desired.

SUMMARY OF THE INVENTION

A primary object of the present invention is to provide an optical transceiver module which has durable latches that secure the module to a receptacle of an electronic device.

Another object of the present invention is to provide an optical transceiver module which has latches that secure the module to a receptacle of an electronic device such that the latches also function as a part of grounding paths of the module.

To achieve the above objects, an optical transceiver module in accordance with the present invention comprises a base, a pair of metallic releasable latches attached to opposite lateral sides of the base, and a housing. The housing includes an upper housing and a lower housing, which are mounted to an upper side and a lower side of the base respectively. Each latch includes a retention portion, and a spring portion bent generally perpendicularly from an outer end of the retention portion. The retention portions of the latches are inserted into receiving grooves defined in side walls of the base. The spring portions of the latches sit on the side steps of the base. The upper housing electrically engages with rear parts of the spring portions. Any electrostatic charge that develops on the upper and lower housings is dissipated to external ground via electrical connections between the latches and an electronic device on which the optical transceiver module is mounted.

Other objects, advantages and novel features of the present invention will become more apparent from the following detailed description when taken in conjunction with the accompanying drawings.

DETAILED DESCRIPTION OF THE INVENTION

Figure 1:
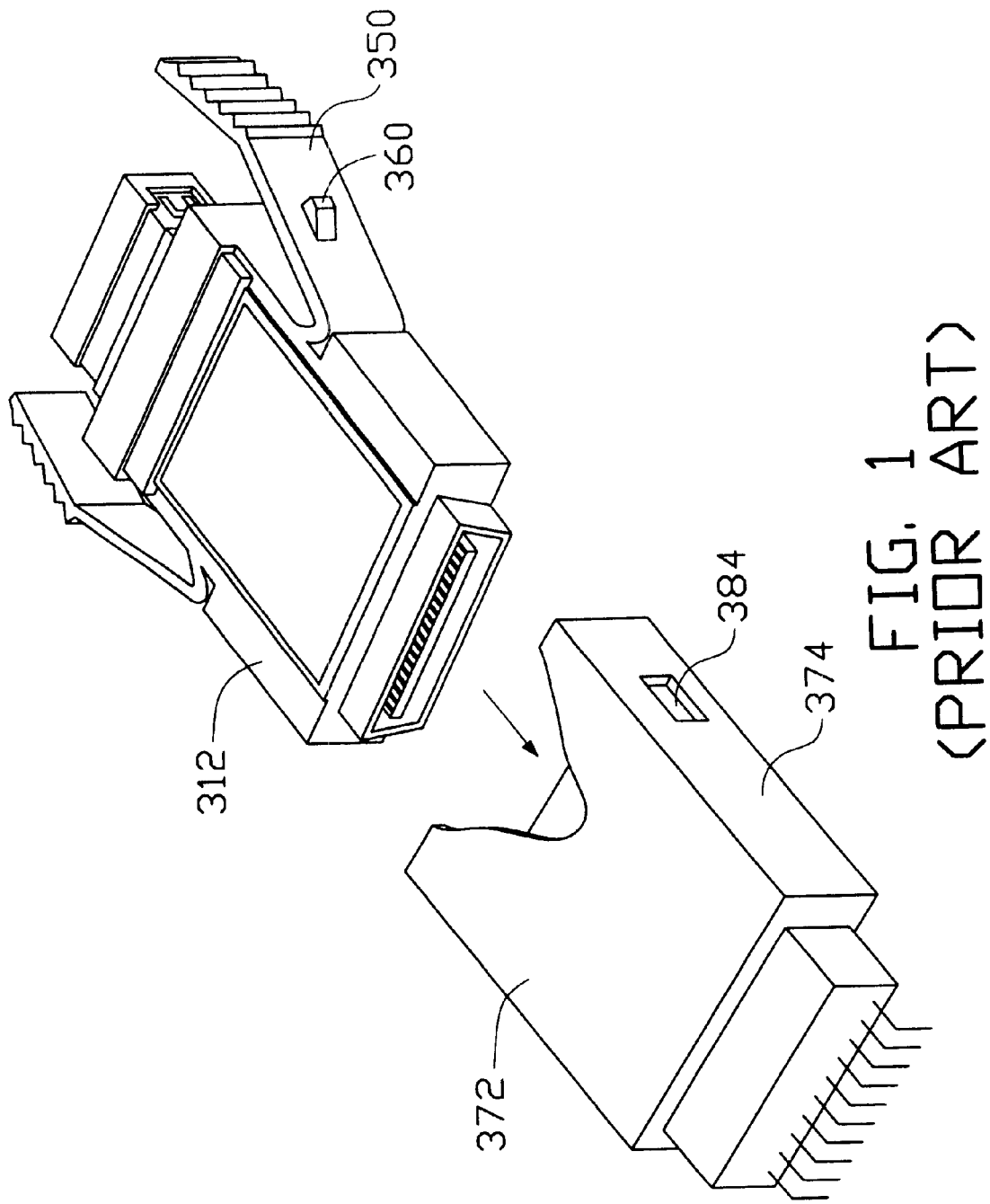
FIG. 1 is a perspective view of a conventional optical transceiver module and receptacle.
Figure 2:
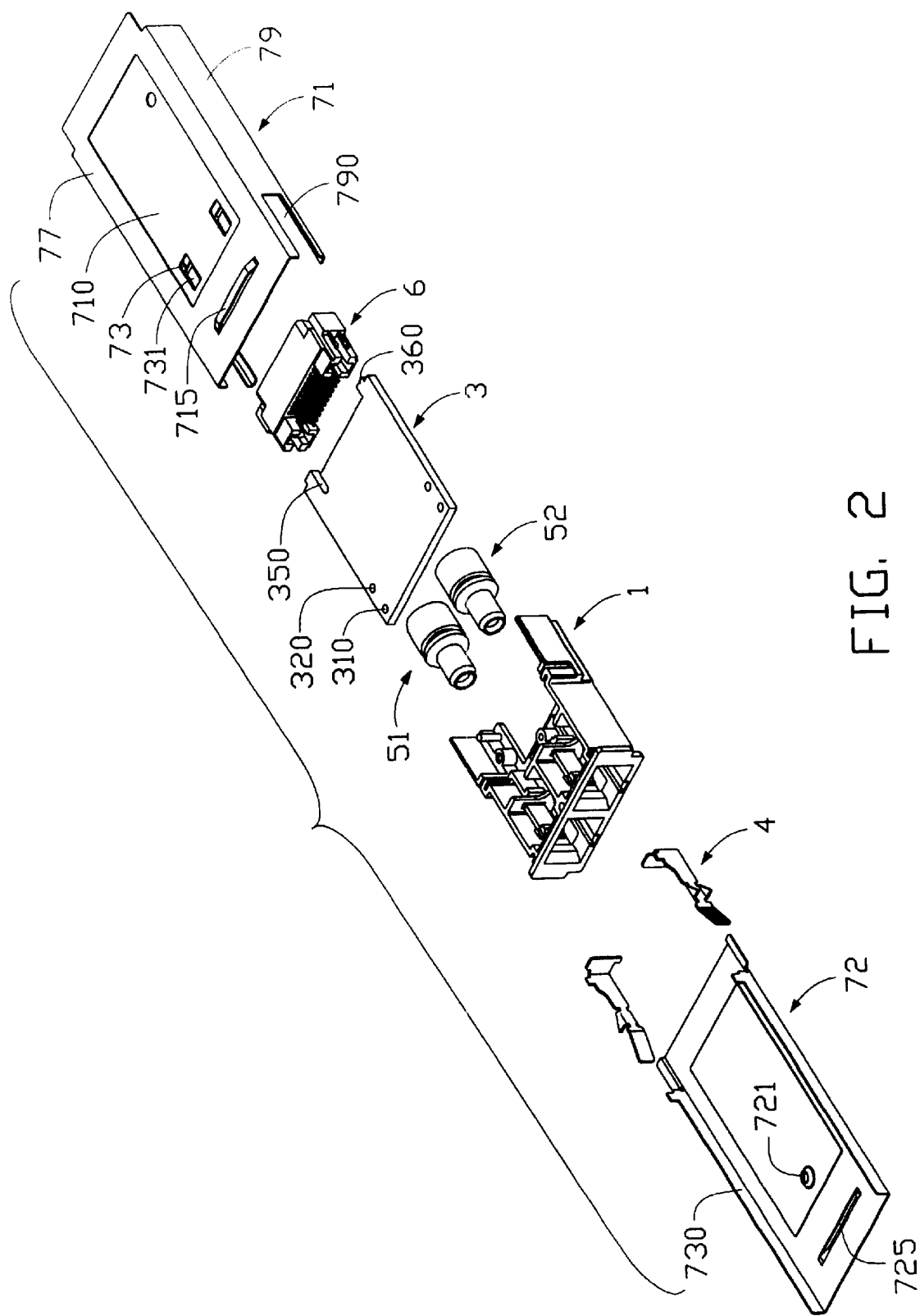
FIG. 2 is an exploded perspective view of an optical transceiver module in accordance with the present invention.

Referring to FIG. 2, an optical transceiver module in accordance with the present invention comprises a base 1, a pair of metallic releasable latches 4 respectively attached to opposite lateral sides of the base 1, and a housing including an upper housing 71 and a lower housing 72.

Figure 3:
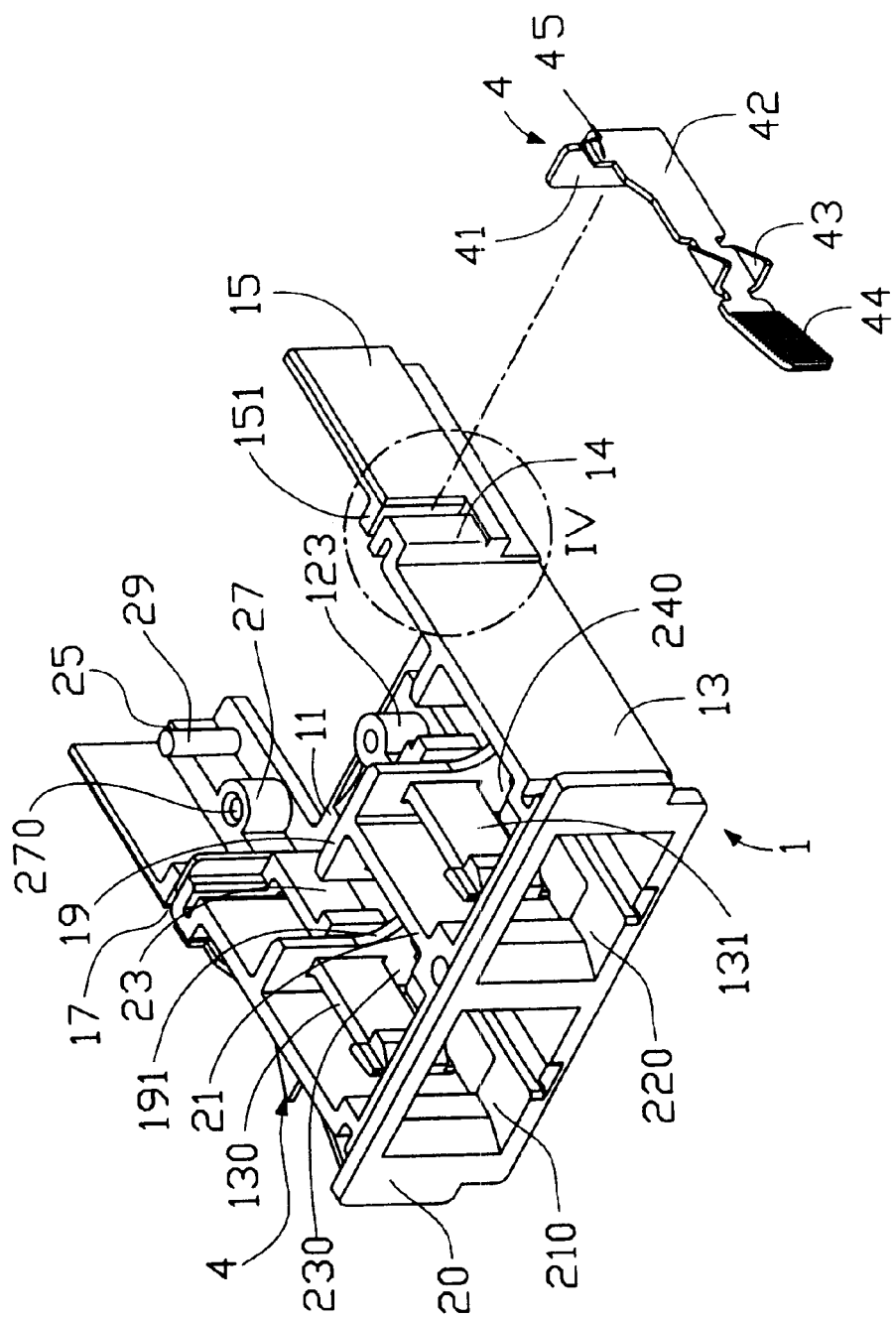
FIG. 3 is an exploded perspective view of a base portion and a metallic releasable latch of the optical transceiver module of FIG. 2.
Figure 4:
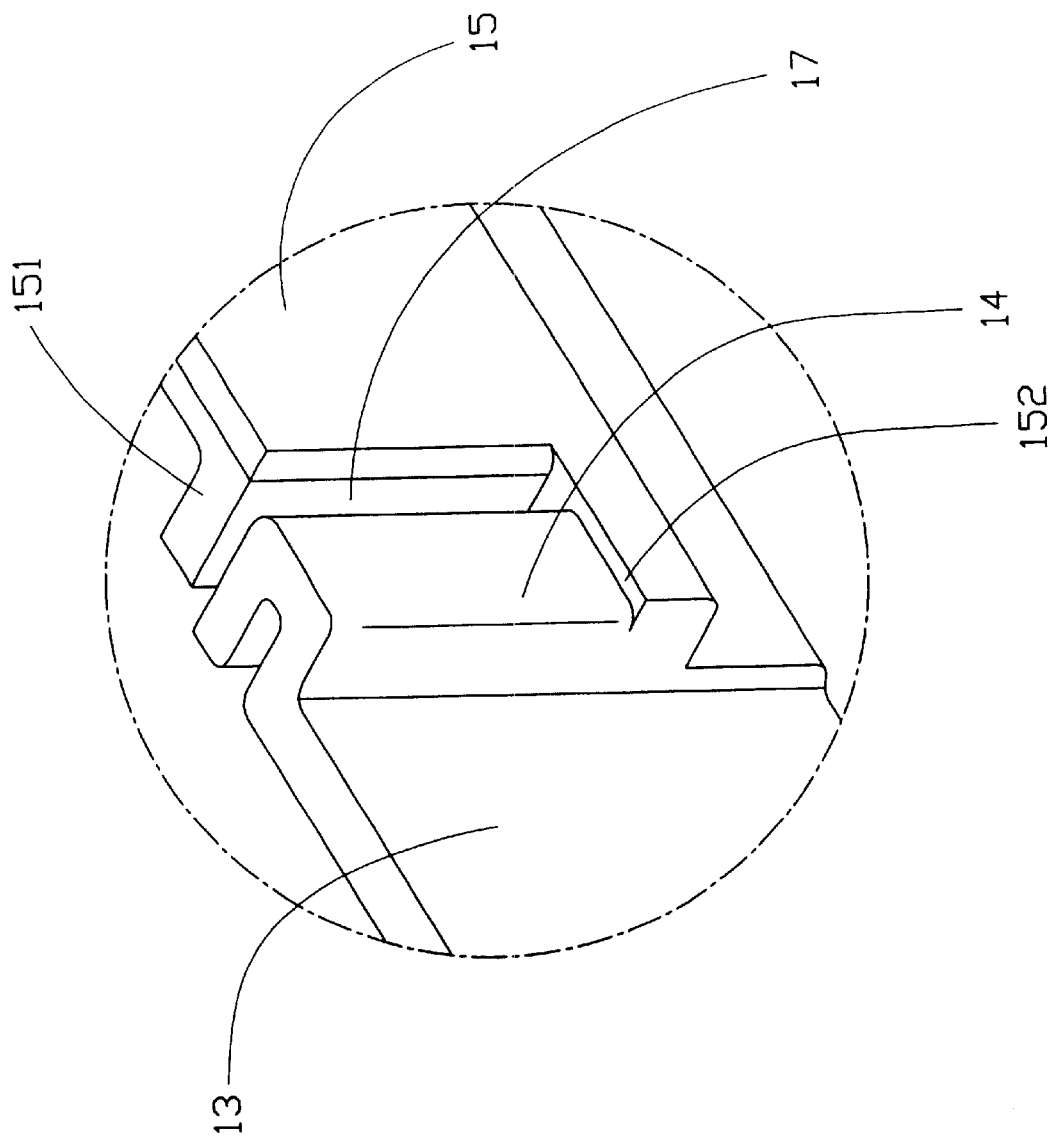
FIG. 4 is an enlarged view of a circled portion IV of FIG. 3.

Referring particularly to FIGS. 3 and 4, the base 1 is made by diecasting. The base 1 includes a bottom plate 11, a pair of forward side walls 13 extending from front portions of opposite lateral sides of the bottom plate 11 respectively, and a pair of rearward side walls 15 extending from rear portions of the opposite lateral sides of the bottom plate 11 respectively. A U-shaped wall 14 adjoins a rear end of each forward side wall 13. An inward wall 151 extends inwardly from a front end of each rearward side wall 15. Each U-shaped wall 14 is opposite to but spaced from its proximate inward wall 151, thereby defining a receiving groove 17 therebetween. A side step 152 is formed below and outwardly from each U-shaped wall 14.

A first stand 19 extends upwardly from the bottom plate 11 of the base 1, and connects with both forward side walls 13. The first stand 19 divides the base 1 into a front part (not labeled) and a back part (not labeled). Two arch-shaped cutouts 191 are defined in the first stand 19. A second stand 21 extends upwardly from the bottom plate 11, and longitudinally connects a middle of the first stand 19 with a front panel 20 of the base 1. Two receiving spaces 230, 240 are defined on opposite sides of the second stand 21 respectively, for receiving a photo diode 51 and a laser diode 52 respectively. A pair of retention ribs 130 (only one visible) extends forwardly from the first stand 19, and is disposed at opposite sides of the receiving space 230 respectively. A pair of retention ribs 131 (only one visible) extends forwardly from the first stand 19, and is disposed at opposite sides of the receiving space 240 respectively.

A hollow column 123 extends upwardly from the bottom plate 11 in back of a middle of the first stand 19. The lower housing 72 is firmly mounted to a bottom face of the base 1 by extending a screw (not shown) through the bottom plate 11 to threadedly engage with the hollow column 123. A mounting platform 25 is inwardly formed from an inner face of a lower portion of each rearward side wall 15. A protruding portion 27 is integrally formed from an inner face of each mounting platform 25. A hole 270 is defined in each protruding portion 27. A post 29 is formed in back of each protruding portion 27.

The front panel 20 is integrally formed by the base 1, and is integrally joined with front ends of the forward side walls 13. A width of the front panel 20 is greater than a distance between the forward side walls 13, to facilitate secure mounting of the upper and lower housings 71, 72 to the base 1. A pair of openings 210, 220 is defined in the front panel 20 in communication with the receiving spaces 230, 240 respectively, so that a complementary optical plug can be inserted through the front panel 20 to engage with the photo and laser diodes 51, 52.

Each latch 4 is formed by stamping a single metallic plate. Each latch 4 includes a retention portion 41, and a spring portion 42 bent generally perpendicularly from an outer end of the retention portion 41. A pair of hooks 43 extends outwardly from top and bottom edges respectively of a front end of the spring portion 42, for engaging with a guide rail of an electronic device (not shown) on which the optical transceiver module is mounted. A knurled handle 44 extends outwardly at an acute angle from the front end of the spring portion 42. Pressing the knurled handle 44 inwardly causes the hooks 43 of the spring portion 42 to disengage from the guide rail or a receptacle (not shown) of the electronic device (not shown). The optical transceiver module can then be withdrawn from the electronic device (not shown).

Referring particularly to FIG. 2, the upper and lower housings 71, 72 are each formed by stamping a single piece of metallic plate. The upper housing 71 includes a top cover 77. A rectangular recess 710 is defined in a top of the top cover 77. A pair of spring tabs 731 is formed from the top cover 77, for contacting metallic housings of the photo and laser diodes 51, 52. A projection bar 715 is upwardly formed from a front end of the upper housing 71, for engaging with a grounding path of the electronic device (not shown). Two side walls 79 depend from opposite sides of the top cover 77 respectively. A rectangular opening 790 is defined in a front end of each side wall 79, for accommodating the spring portion 42 and the knurled handle 44 of the corresponding latch 4.

The lower housing 72 has a hole 721 defined in a middle of a front portion thereof. A projection bar 725 is downwardly formed from a front end of the lower housing 72, for engaging with a grounding path of the electronic device (not shown). A pair of flanges 730 extends upwardly from opposite lateral sides of the lower housing 72 respectively.

A printed circuit board (PCB) 3 has a pair of holes 310, 320 defined near each of opposite sides of a front portion thereof. The PCB 3 at the holes 310, 320 is coated with conductive material which is electrically connected with grounding traces on the PCB 3. A keyway 350 and a key 360 are formed at opposite sides of a rear end of the PCB 3. The keyway 350 and key 360 provide polarity when mounting an electrical connector 6 to a rear end of the PCB 3.

Figure 5:
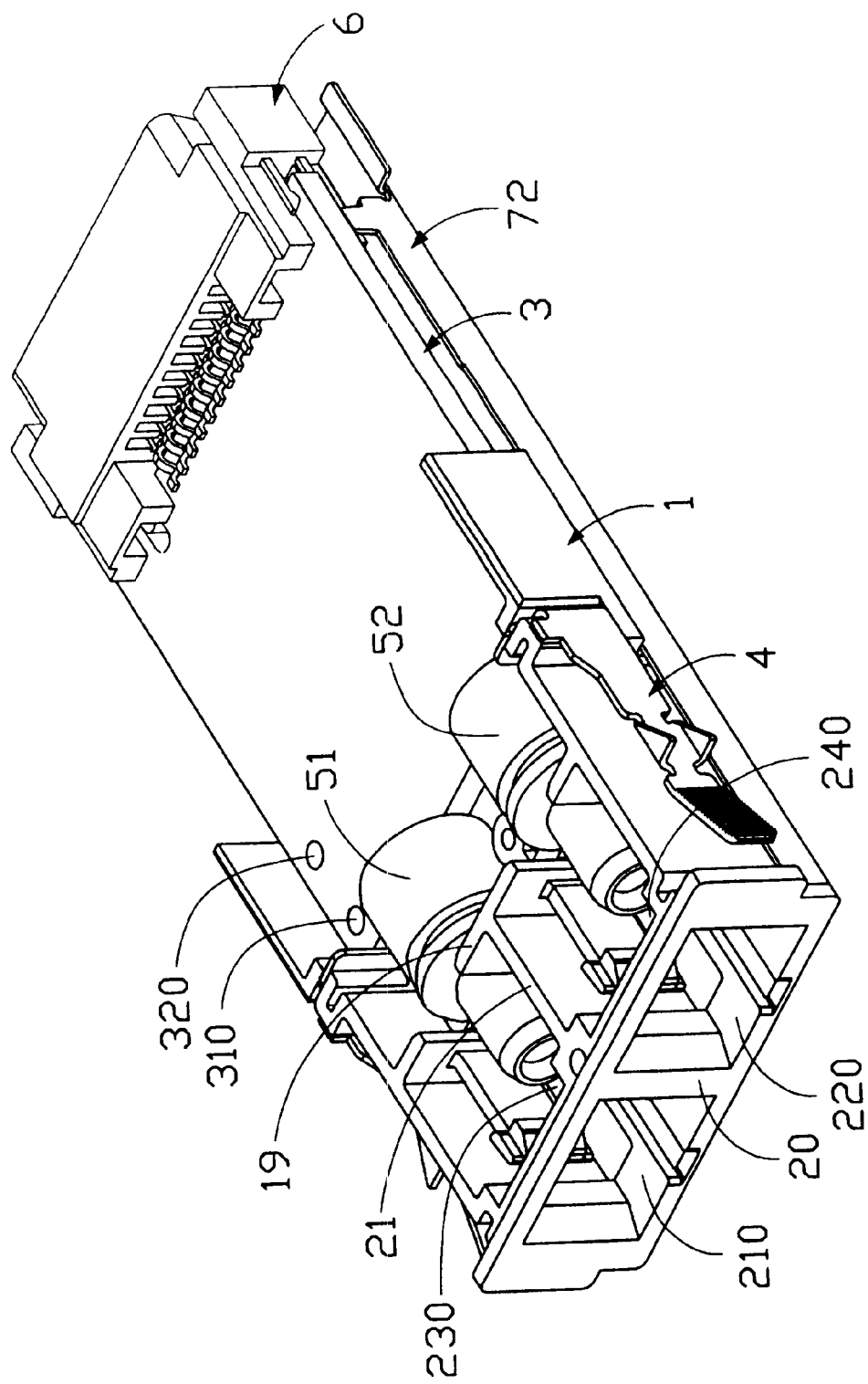
FIG. 5 is a partly assembled view of the module of FIG. 2.
Figure 6:
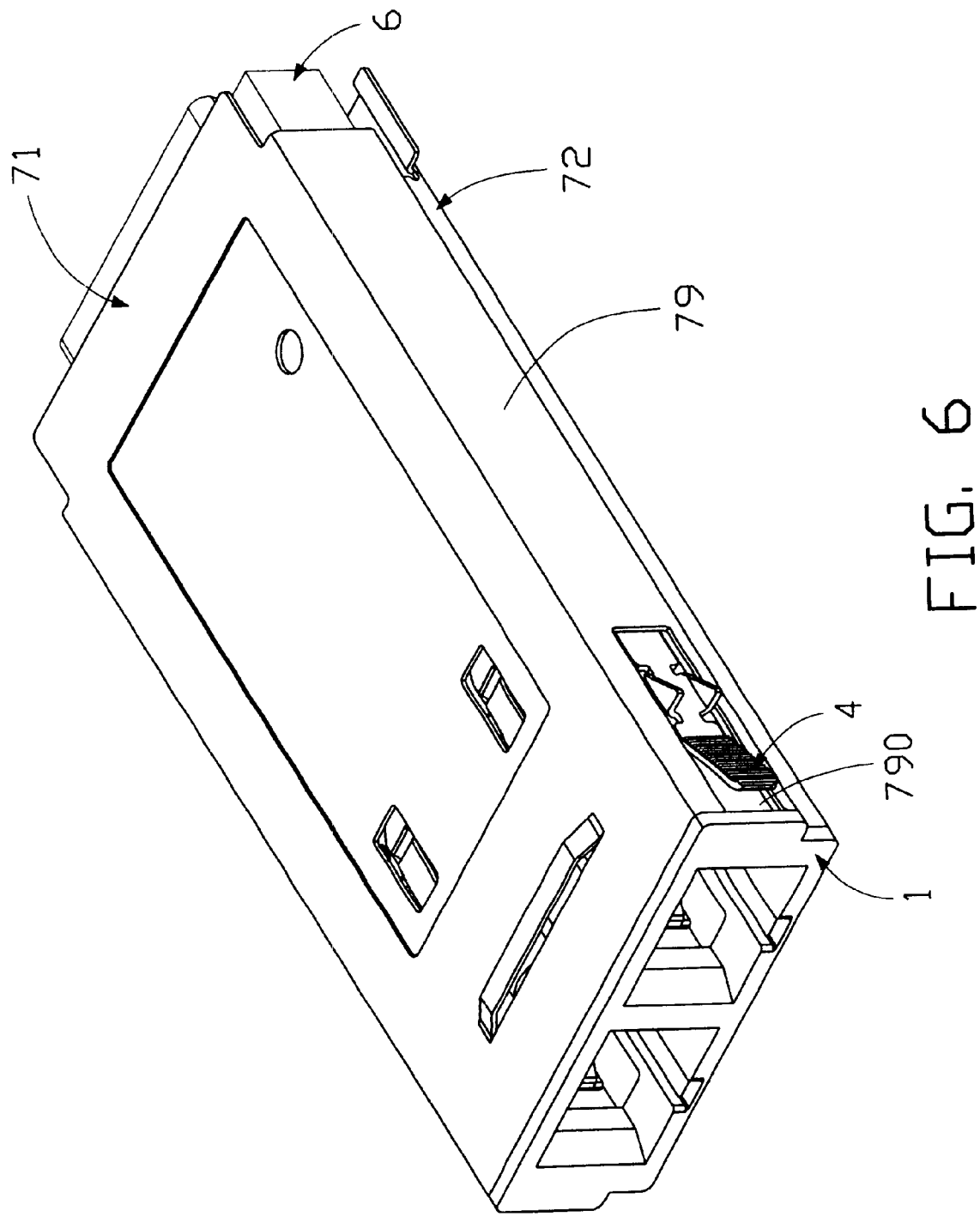
FIG. 6 is a fully assembled view of the module of FIG. 2.

Referring to FIGS. 5 and 6, is assembly, the photo and laser diodes 51, 52 are soldered to a front end of the PCB 3. The housings of the photo and laser diodes 51, 52 are thus electrically connected with the grounding traces of the PCB 3. Then the electrical connector 6 is soldered firmly to the rear end of the PCB 3.

The PCB 3 is then mounted to the base 1. Screws (not shown) are extended through the holes 310 of the PCB 3 to threadedly engage with the protruding portions 27 of the base 1. The columns 29 of the base 1 are fittingly received in the holes 320 of the PCB 3. The base 1 is thus electrically connected with the grounding traces of the PCB 3.

The retention portions 41 of the latches 4 are inserted into the receiving grooves 17 of the base 1. The spring portions 42 of the latches 4 sit on the side steps 152 of the base 1.

Finally, the upper and lower housings 71, 72 are mounted to the base 1 to positions in which front edges of the upper and lower housings 71, 72 abut against a rear face of the front panel 20. The spring portions 42 and the knurled handles 44 of the latches 4 are accommodated in and project outwardly from the openings 790 of the upper housing 71. The upper housing 71 presses the tag 45 of the latch 4 for preventing the latch 4 from being dropped from the base 1. The upper housing 71 electrically engages with rear parts of the spring portions 42. The spring tabs 731 of the upper housing 71 electrically engage with the metallic housings of the photo and laser diodes 51, 52. A screw (not shown) is inserted through the hole 721 of the lower housing 72 to threadedly engage with the hollow column 123 of the base 1. The lower housing 72 is thus firmly secured to the base 1.

In use, any electrostatic charge that develops on the upper and lower housings 71, 72 is dissipated to ground via the electrical connections between the latches 4 and the electronic device. That is, via external grounding paths. Such electrostatic charge is also dissipated to ground via the electrical connections between the base 1 and the grounding traces of the PCB 3, and via the electrical connections between the photo and laser diodes 51, 52 and the grounding traces of the PCB 3. That is, via internal grounding paths. Such electrostatic charge is further dissipated to ground via the electrical connections between the projection bars 715, 725 and the electronic device. That is, via external grounding paths. Similarly, any electromagnetic noise absorbed by the upper and lower housings 71, 72 is dissipated to ground via the external and internal grounding paths. Thus, the performance of the optical transceiver module of the present invention is significantly enhanced.

It should be understood that various changes and modifications to the presently preferred embodiment described herein will be apparent to those skilled in the art. Such changes and modifications may be made without departing from the spirit and scope of the present invention and without diminishing advantages of the present invention. Thus, it is intended that such changes and modifications be covered by the appended claims.

What is claimed is:

1. An optical transceiver module for transmitting electrical and optical signals, the module comprising:

a base made of conductive material, the base having side walls defining grooves and forming steps;

a printed circuit board mounted on the base and having at least one grounding trace electrically connecting with the base;

an electrical connector mounted to a rear end of the printed circuit board;

a photo diode and a laser diode mounted on the base and electrically connecting with the at least one grounding trace of the printed circuit board;

a pair of metallic latch members adapted to electrically and mechanically engage with an electronic device in which the optical transceiver module is mounted, each of the latch members comprising a retention portion fitted in a corresponding groove of the side walls of the base and a spring portion sitting on a corresponding step, wherein the spring portion extends generally perpendicularly from an outer end of the retention portion; and an upper housing and a lower housing mounted to an upper side and a lower side of the base respectively, the upper housing electrically engaging with the latch members, the upper housing having spring tabs engaging with metallic housings of the photo and laser diodes, the upper housing further having openings through which hooks and handle portions of the latch members extend outwardly, the hooks being adapted to engage with the electronic device.

2. The optical transceiver module in accordance with claim 1, wherein the base forms a protruding portion and a post, the printed circuit board has first and second holes defined therein, a screw extends through the first hole to threadedly engage with the protruding portion, the post fits in the second hole, and the printed circuit board at the first and second holes is coated with conductive material electrically connecting with the at least one grounding trace of the printed circuit board.

3. The optical transceiver module in accordance with claim 1, wherein each of the side walls of the base includes a forward side wall, a rearward side wall and a U-shaped wall between the forward and rearward side walls, the grooves each being defined between a corresponding rearward side wall and a corresponding U-shaped wall, the steps each being formed below and outwardly from a corresponding U-shaped wall.

4. The optical transceiver module in accordance with claim 1, wherein the base also has a front panel, and each of the upper and lower housings has a front edge abutting against a rear face of the front panel.

5. The optical transceiver module in accordance with claim 1, wherein the lower housing is mounted to the base by extending a screw through the lower housing to threadedly engage with the base.

6. The optical transceiver module in accordance with claim 1, wherein each of the upper housing and the lower housing is formed by stamping a single piece of metallic plate.

7. An optical module comprising:
   a base defining a side wall with a groove therethrough and a step thereon;
   a metal latch including a retention portion, a spring portion extending perpendicularly from said retention portion, a handle formed on a distal end of said spring portion, and a hook formed on said spring portion inside side handle, a tag formed on the spring portion;
   a housing defining an opening accommodating said spring portion of the latch wherein
      the retention portion is received within the groove to restrict lengthwise movement of the latch, a portion of the spring portion is seated upon the step to restrict vertical movement of the latch, and the housing cooperates with the base to sandwich the tag therebetween to restrict lateral movement of the latch.

\* \* \* \* \*